N. C. FOWLER.

Fire-Proof Box for Papers, &c.

No. 8,654. Reissued April 1, 1879.

WITNESSES

A. J. Oettinger.

Christopher Amazeen

INVENTOR.

Nathaniel C. Fowler.

by his attys

Clarke & Raymond.

N. PETERS, PHOTO-LITHOGRAPHER, WASHINGTON, D. C.

UNITED STATES PATENT OFFICE.

NATHANIEL C. FOWLER, OF BOSTON, MASSACHUSETTS.

IMPROVEMENT IN FIRE-PROOF BOXES FOR PAPERS, &c.

Specification forming part of Letters Patent No. 212,138, dated February 11, 1879; Reissue No. 8,654, dated April 1, 1879; application filed February 27, 1879.

*To all whom it may concern:*

Be it known that I, NATHANIEL C. FOWLER, of Boston, in the State of Massachusetts, have invented an Improvement in Portable Fire-Proof Note-Cases for Papers, &c., of which the following is a specification:

This invention relates to the manufacture of portable fire-proof note-boxes from asbestus-board for valuables, and it may be used in a variety of ways for the purpose of affording additional security in safe-deposit vaults, or ordinary safes, or for providing in the cases of trunks, so commonly used for the reception of securities, a fire-proof portable note-case, and many other ways too numerous to mention.

The form which I prefer to use is made in the form of a box, one part sliding telescopically within the other; but the same may be used in the form of a covered drawer arranged to slide into a casing, or in any other shape which shall embody the particular and essential features hereinafter set forth.

The material features of the invention are illustrated in the accompanying drawings, in which—

Figure 1:
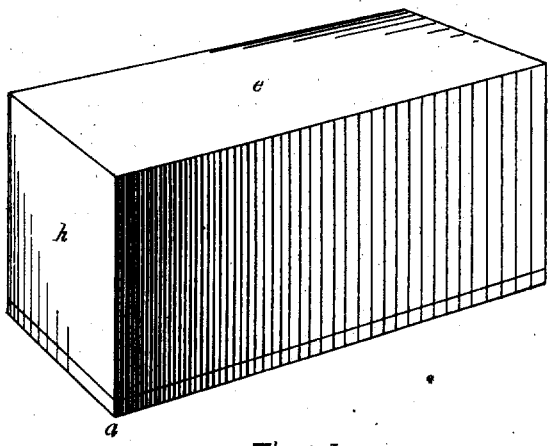
Figure 2:
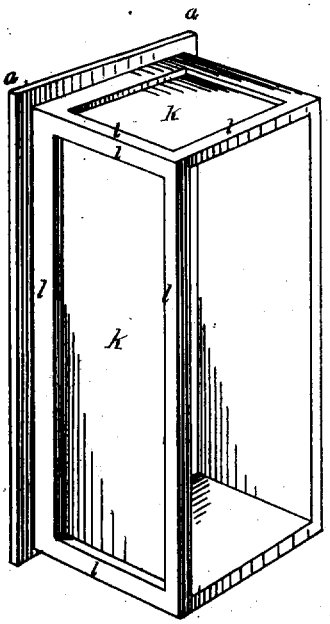
Figure 3:
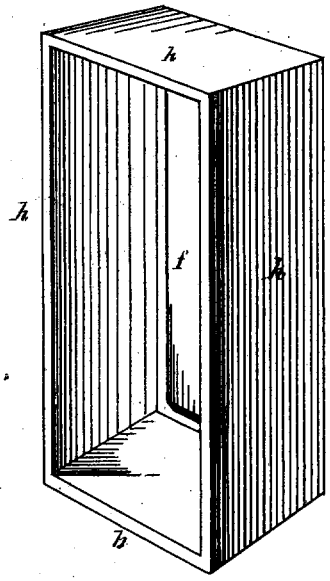
Figure 4:
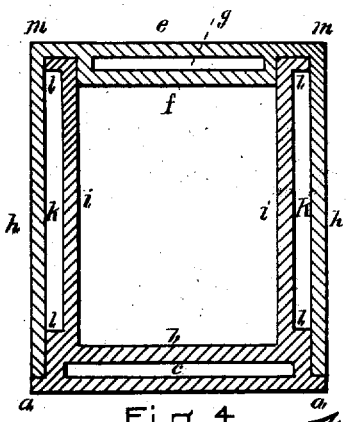

Figure 1 is a perspective of the exterior of a box constructed according to my invention. Fig. 2 is a perspective of the lower part of said box, and Fig. 3 is a perspective cover of said box. Fig. 4 is a cross-section through the box.

Like letters indicate like parts in all the figures.

The box is composed of strongly-compressed asbestus-board, united at its joints and corners by a cement composed of silicate of soda in solution mixed with silicate of magnesia. It is so arranged that two or more thicknesses of asbestus-board surround the papers in the interior cavity upon all sides, and these thicknesses of asbestus-board are separated by an air-space, so that there appears upon every side of the papers an air-space between two thicknesses of fire-proof material.

In the drawings, *a* represents the exterior bottom of the box. *b* represents the interior bottom; *c*, an air-space between the two bottoms. *i* represents the sides or walls of the cavity containing the papers. On all the edges of these walls *i* are stiles *l*, which serve to make upon the sides and ends of this receptacle for papers the sunk panels *k*. *f* represents the interior cover of the box; *e*, the exterior cover, and *g* the air-space between the two covers. This cover fits into the cavity for papers, and thus renders it pretty certain that even an injury to the sides of the exterior casing will not expose the papers to injury, as might be the case if the cover did not shut into the cavity for papers, but simply shut over it.

The measurements of such a box as this will be equal to the size of the cavity for papers with about six times the thickness of asbestus-board used added to it for each dimension, because the air-space ought never to be less than a single thickness of board. In case it is desired to have more air-space, I prefer to provide that by increasing the number of air-chambers, and also the number of thicknesses of board used.

The figures represent a box provided with one surrounding set of air-chambers; but it is obvious that this number of chambers can be increased greatly and at will.

As asbestus-board is ordinarily made it has not a good finish; but I am enabled to produce a finish upon it like stone by saturating it with silicate of soda, and rubbing into the surface finely-powdered talc. This talc also will take a stain from dyes of very many sorts, and thus an ornamental finish may be produced.

The cement used for uniting the joints of the box (and here I would remark that wherever stiles are arranged round the edges it is desirable to so arrange them as to break joints with the walls of the box) is silicate of soda in solution, thickened with silicate of magnesia. This seems slowly to so enter into combination with the magnesian silicate of the asbestus-board as to make the joints almost, if not quite, as firm as the body of the board itself; and in case it be desired to hasten the operation of union, it can readily be done by the use of a blow-pipe upon the joints after cementing them. In this case the temperature need not be raised to redness. The joints are exceedingly firm and strong. When the box is exposed to the temperature of a fire, and is called upon to exert its fire-proof qualities, these joints seem absolutely to fuse together.

In case it is desired to ornament the box with gilding or with metallic surfacing, it may be done by the use of bronze powders in a varnish of silicate of soda, which preserves the inferior metals from oxidation, at the same time attaching them very firmly.

Boxes of this construction made of a thickness of asbestus-board about one-eighth of an inch thick, and provided with one set of air-chambers, have preserved papers in a legible condition in the strongest heat of a crucible-furnace for twelve hours.

Such boxes, it will be seen, would be very desirable, on account of their small dimensions, to place in a safe for the special inclosure of merchants' books of account, as well as for containing securities.

It will be observed that three heads of invention concur in the complete structure of this box: An improved quality given to the asbestus-board, by which it is made sufficiently strong and compact for the purpose—this quality is given to it by saturating it with silicate of soda, and rubbing or compressing silicate of magnesia (talc) into its surface; the employment at the joints and corners of the silicate of soda and silicate of magnesia cement, which possesses peculiar qualities with regard to this material, (asbestus-board;) a peculiar mechanical construction, by means of stiles and panels, whereby air-spaces are formed in the walls, floor, and top of the box; and I therefore claim as my invention—

1. A fire-proof box of asbestus-board, in which the board is saturated with silicate of soda, and surface finished by silicate of magnesia compressed or rubbed into the asbestus-board, substantially as described.

2. A fire-proof box of asbestus-board, in which the joints and the corners are rendered less susceptible to the influences of high temperatures by the presence of powdered silicate of magnesia in the silicate of soda used as cementing material, substantially as described.

3. A fire-proof box of asbestus-board made in two parts, one adapted to fit telescopically over the other, and one part of which is provided with stiles and panels on the surface adjacent to the other part, substantially as described.

NATHANIEL C. FOWLER.

Witnesses:

F. F. RAYMOND, 2d,

A. J. OETTINGER.